United States Patent
Fu et al.

(10) Patent No.: US 12,192,031 B2
(45) Date of Patent: Jan. 7, 2025

(54) INVOKING DEVICE SERVICES IN PRESET SOFTWARE FRAMEWORKS

(71) Applicant: BEIJING XIAOMI MOBILE SOFTWARE CO., LTD., Beijing (CN)

(72) Inventors: Sichang Fu, Beijing (CN); Guoliang Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/903,986

(22) Filed: Sep. 6, 2022

(65) Prior Publication Data

US 2023/0327908 A1 Oct. 12, 2023

(30) Foreign Application Priority Data

Apr. 6, 2022 (CN) .......................... 202210359663.7

(51) Int. Cl.
| | |
|---|---|
| *H04L 12/40* | (2006.01) |
| *H04L 12/66* | (2006.01) |
| *H04L 43/04* | (2022.01) |

(52) U.S. Cl.
CPC ........ *H04L 12/40032* (2013.01); *H04L 12/66* (2013.01); *H04L 43/04* (2013.01)

(58) Field of Classification Search
CPC .... H04L 12/40032; H04L 12/66; H04L 43/04
USPC ....................................................... 709/224
See application file for complete search history.

(56) References Cited

U.S. PATENT DOCUMENTS

| | | | | |
|---|---|---|---|---|
| 10,735,262 | B1 * | 8/2020 | Webb ................. | H04L 41/0866 |
| 10,817,280 | B1 * | 10/2020 | Masrani .................... | G06F 8/30 |
| 2006/0059549 | A1 * | 3/2006 | Suzuki .................... | H04L 63/20 726/9 |
| 2012/0059838 | A1 * | 3/2012 | Berntson ............... | G06F 16/951 707/E17.014 |
| 2019/0334918 | A1 * | 10/2019 | AbiEzzi .............. | H04L 63/0281 |
| 2019/0387458 | A1 * | 12/2019 | Li ......................... | H04W 48/14 |
| 2020/0159591 | A1 * | 5/2020 | Rudolph ............... | H04L 67/562 |
| 2020/0336481 | A1 * | 10/2020 | Fan ........................ | H04L 9/0869 |
| 2021/0160103 | A1 * | 5/2021 | Haque ..................... | G06F 9/546 |
| 2021/0377896 | A1 * | 12/2021 | Wei ......................... | H04L 67/56 |
| 2022/0294489 | A1 * | 9/2022 | Min ...................... | H04W 72/12 |

FOREIGN PATENT DOCUMENTS

CN 110493067 A 11/2019

OTHER PUBLICATIONS

Extended European Search Report of EP Application No. 22194764.1 dated Jun. 9, 2023, (10p).

* cited by examiner

*Primary Examiner* — David P Zarka
(74) *Attorney, Agent, or Firm* — Arch & Lake LLP

(57) ABSTRACT

A method for operating a software framework is provided. The method may be applied to a software framework applicable to a gateway device, the software framework includes an application service layer and a basic service layer, the application service layer includes at least one device service registered in advance, and the basic service layer includes a data bus built in advance. The method includes: realizing a capability of a device associated with the gateway device based on the device service; and realizing communication between the device service and an external service based on the data bus, where the external service includes a device service belonging to a same gateway device as the device service or a different gateway device than the device service.

10 Claims, 7 Drawing Sheets

INVOKING DEVICE SERVICES IN PRESET SOFTWARE FRAMEWORKS

CROSS-REFERENCE TO RELATED APPLICATIONS

The present application is filed based upon and claims the benefit of priority to Chinese Application NO. 202210359663.7 filed on Apr. 6, 2022, the contents of which are incorporated herein by reference in their entireties for all purposes.

TECHNICAL FIELD

The disclosure relates to the field of terminal technology, in particular to a software framework, operation method, invoking service method, apparatus, device and medium.

BACKGROUND

With the rapid development of terminal technology, at present, there are more and more intelligent devices in users' homes, such as Bluetooth, ZigBee and other devices, which need gateway devices to connect to the external network. Due to the limited coverage of gateways, in each home environment, more than one gateways are usually needed at the same time. The types of gateways are such as Bluetooth gateway, PLC gateway, etc.

SUMMARY

According to a first aspect of the present disclosure, there is provided a method for operating a software framework. The method is applied to a software framework, the software framework is applicable to a gateway device, the software framework includes an application service layer and a basic service layer, the application service layer includes at least one device service registered in advance, and the basic service layer includes a data bus built in advance. The method includes:
  realizing a capability of a device associated with the gateway device based on the device service; and
  realizing communication between the device service and an external service based on the data bus, where the external service includes a device service belonging to a same gateway device as the device service or a different gateway device with the device service.

According to a second aspect of the present disclosure, there is provided a method for invoking a service. The method is applied to a first device service in a preset software framework, the preset software framework is applicable to a gateway device, the preset software framework includes a plurality of device services registered in advance, and each of the device services corresponds to a capability of a device associated with the gateway device in current environment.

The method includes:
  generating service invocation request information in response to detecting that the current environment meets a condition of invoking a second device service in the preset software framework;
  sending the service invocation request information to the second device service based on a data bus preset in the preset software framework; and
  receiving service invocation response information sent by the second gateway service based on the data bus, where the service invocation response information includes information generated based on an obtained processing result after the second device service performs processing on the received service invocation request information.

According to a third aspect of the present disclosure, there is provided a gateway device, the device includes:
  a processor and a memory for storing computer programs;
  where the processor is configured to implement the method for invoking a service described in any one of the above aspects when executing the computer programs.

According to a fourth aspect of the present disclosure, there is provided a computer readable storage medium, on which a computer program is stored, where, when the program is executed by a processor, the method for invoking a service described in any one of the above aspects is implemented.

It will be understood that the above general description and the following detailed description are exemplary and explanatory, and do not limit the present disclosure.

BRIEF DESCRIPTION OF THE DRAWINGS

The drawings here are incorporated into and form a part of the specification, showing embodiments in accordance with the present disclosure, and are used together with the specification to explain the principles of the present disclosure.

DETAILED DESCRIPTION

Here, embodiments will be described in detail, and the examples are shown in the accompanying drawings. When the following description refers to the drawings, unless otherwise indicated, the same numbers in different drawings represent the same or similar elements. The embodiments described in the following embodiments do not represent all embodiments consistent with the present disclosure. Instead, they are examples of devices and methods consistent with some aspects of the present disclosure as detailed in the appended claims.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

For making it convenient for those skilled in the art to understand, multiple implementation modes are listed in the embodiments of the disclosure to describe the technical solutions of the embodiments of the disclosure clearly. Of course, those skilled in the art can understood that multiple embodiments provided in the embodiments of the disclosure can be executed independently, or can be combined with methods of the other embodiments in the embodiments of the disclosure for execution together, or may be executed independently or after combined with some methods in other related technologies. No limits are made thereto in the embodiments of the disclosure.

Figure 1A:
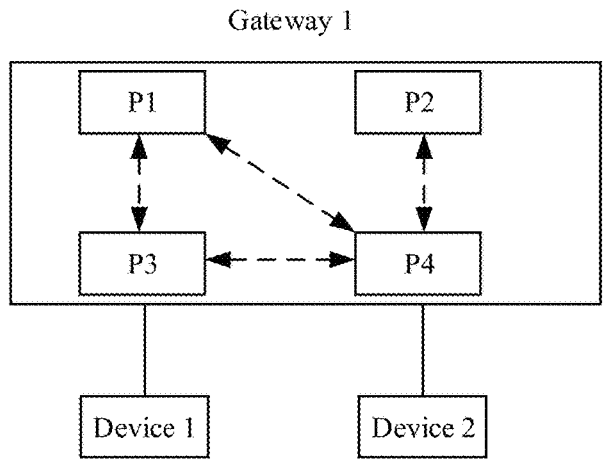
FIG. 1A is a schematic diagram of information transmission channel coupling between various capabilities within the gateway shown according to an embodiment of the present disclosure.

With the rapid development of terminal technology, at present, there are more and more intelligent devices in users' homes, such as Bluetooth, ZigBee and other devices. Among them, Bluetooth, ZigBee and other devices need to be connected to the external network through the gateway device. Due to the limited coverage of gateways, in each home environment, more than one gateways are usually needed at the same time. The types of gateways are such as Bluetooth gateway, PLC gateway, etc. In related art, there may be Bluetooth, PLC, automation and other capabilities within a gateway. For example, FIG. 1A is a schematic diagram of information transmission channel coupling between various capabilities within the gateway shown according to an embodiment of the present disclosure. As shown in FIG. 1A, there may be capability P1, capability P2, capability P3 and capability P4 etc., within gateway 1 associated with device 1 and device 2. When information interaction is needed between two capabilities, both parties need to establish information transmission channels in advance. If a capability needs to interact with more than one other capabilities, it needs to establish a separate information transmission channel with each other capability in advance. As shown in FIG. 1A, the information transmission channels between P1 and P3, P1 and P4, P2 and P4, P3 and P4 need to be established in advance, which leads to the problem of information transmission coupling. On the other hand, after completing the code development of the gateway program for a hardware platform, if the hardware platform is replaced, the code of the gateway program needs to be re-implemented on the new platform, that is because the hardware interfaces of different platforms are different. So, it is needful to maintain a set of code of the gateway program for each platform, resulting in the problem of business development coupling. The above problems of information transmission coupling and service coupling lead to heavy workload of gateway development, make it very inconvenient to expand the gateway capacity, and are not conducive to the later maintenance of the gateway.

Based on this, the present disclosure proposes a preset software framework applicable to a gateway device. The preset software framework adopts a service-oriented architecture, which can abstract the capabilities of each device into the services in the preset software framework, and then realize the communication of the capabilities of each device through the communication between the services. It is worth noting that service-oriented architecture (SOA) is a component model, which connects different capability units of applications (called services) through well-defined interfaces and contracts between these services. The interface is defined in a neutral way, which is independent of the hardware platform, operating system and programming language that implements the service. This enables the services built in the above preset software framework to interact in a unified and universal way, so that the decoupling of business development can be realized, and the scalability and reusability of code can be improved. By introducing the data bus into the preset software framework, the application development logic in the gateway can be greatly simplified, so that each application needs to pay attention to its own algorithm logic, and the data transmission can be unified to the data bus, realizing the decoupling of information transmission. The cross-device software framework, operation method, invoking service method, apparatus, device and medium of the present disclosure are introduced below with specific embodiments.

Figure 1B:
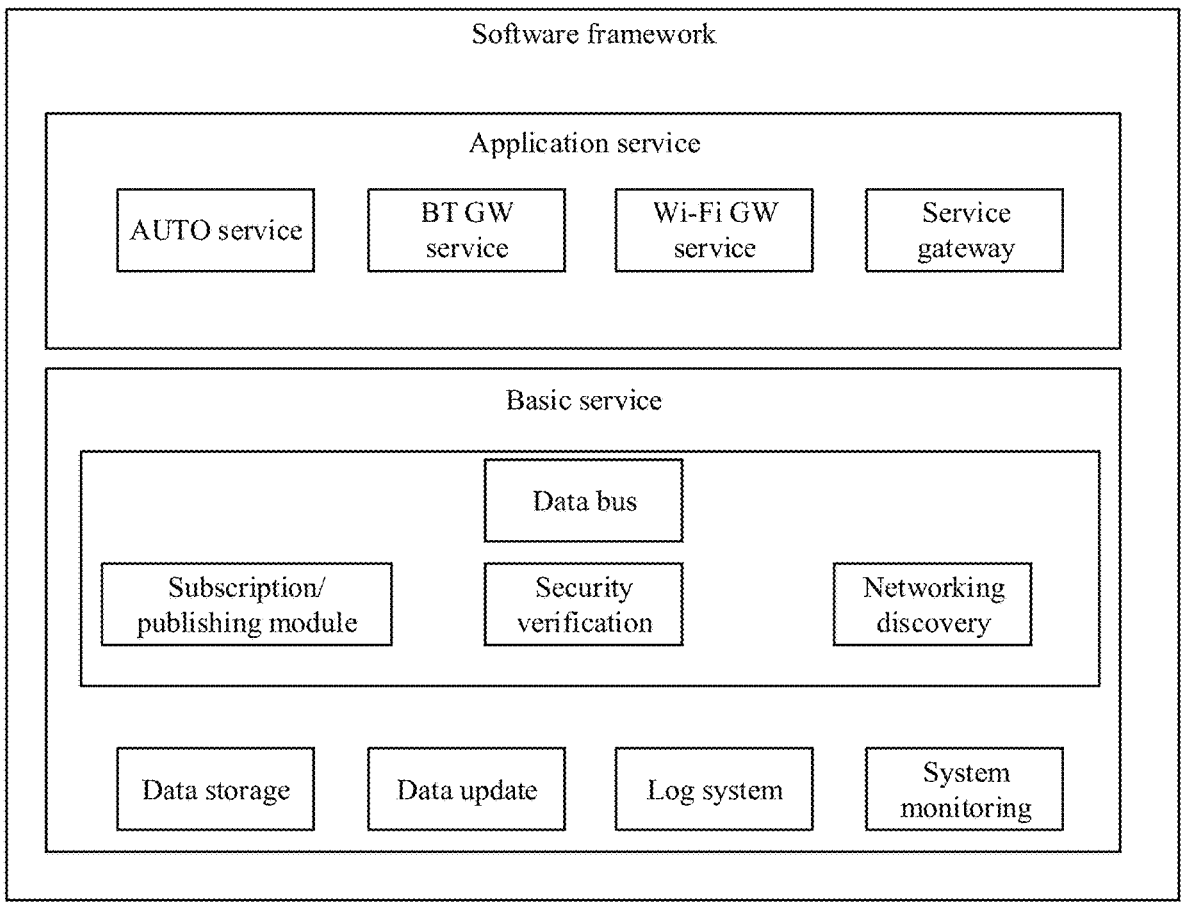
FIG. 1B is a structural diagram of a software framework shown according to an embodiment of the present disclosure.

FIG. 1B is a structural diagram of a software framework shown according to an embodiment of the present disclosure. The software framework of this embodiment is applicable to a gateway device. As shown in FIG. 1B, the software framework includes an application service layer and a basic service layer. The application service layer includes at least one device service registered in advance, and the basic service layer includes a data bus built in advance. Where:

The device service corresponds to a capability of a device associated with the gateway device. For example, the device service may include at least one of AUTO service, BT GW service, Wi-Fi GW service and service gateway.

Auto service is used to provide automation capability. BT GW service is used to provide Bluetooth gateway capability. Wi-Fi GW service is used to provide Wi-Fi gateway capability. The service gateway is used to provide gateway services of the current gateway device, which is not limited in this embodiment.

The data bus may be used to realize the communication between the device service and an external service, which is a device service belonging to a same gateway device as the device service or a different gateway device with the device service.

In some embodiments, the data bus may be used to realize invocation of the external service to the device service by subscribing to or publishing a preset topic. For example, the preset topic may include at least one of the transmission range of the current information, the receiver identification information of the current information (e.g., information such as the name of the device service) and the message type of the current information.

In this embodiment, the topics subscribed or published between various device services may be divided into local topics and global topics. Among them, the transmission range of local topics may be within a same gateway device, while the transmission range of global topics may be different gateway devices, that is, to achieve cross-device transmission. For example, the general format of the topic of this embodiment may be:

${domain_name}/${service_name}/${service_defined}/xxx.

It can be seen that, "/" can be used for content segmentation in the general format of topics, among which: ${domain_name} can be used to distinguish the scope of topics, and information such as device ID can be used for cross-device addressing; or, the reserved domain name "local" may be used to represent the transmission range between services under the local gateway; "${ service_name}" is the service name, which can be used to distinguish each service; "${service_defined}/xxx" is a customized interface for services. Further, the following rule symbols "+" and "#" for matching topics are further defined in this embodiment. Specifically, "+" can be used for single-layer matching of topics, which can be placed at the middle or last level of subscribed topics, that is, when matching topics, the level of "+" is matched; And, "#" can be used for multi-level matching of topics, which can be placed at the end of the subscription topic, that is, when matching topics, it can be matched to the level of "#" and all subsequent levels. Understandably, when the topic is successfully matched, it can be determined that the current topic is the topic subscribed by the service, and then the information corresponding to the topic can be transmitted to the service.

In some embodiments, the data bus can also be used to discover other gateway devices around the gateway device and network with the discovered other gateway devices. For example, after each gateway device is powered on, it may first find out actively whether there is a master hub device around it (for example, through the user datagram protocol UDP multicast mode, which is not limited in this embodiment): if there is a master hub device, it can connect to the master hub device through an external data bus; if there is no master hub device, it may start the election process, that is, each device can multicast its own device attribute information profile (that is, some attributes of the device itself, including its own ability, election priority and other information), and listen to the device attribute information profile of other devices at the same time; then, when it is found that the election priority of other devices is higher, it may exit the election; if no device with higher priority is found within the set time (such as 30 s, etc.), it can upgrade itself to be the main hub device, and then realize the networking centered on the main hub device.

In some embodiments, the above data bus can further be used to verify the security of other gateway devices by means of verifying digital certificates before establishing communication connections with other gateway devices. Among them, the issuance and authentication process of digital certificates may be referred to the explanation and description in related art, which is not limited in this embodiment.

In some embodiments, the above basic service layer may further include at least one of the following services;

A data storage service is used for storing system data of the software framework;

A data update service is used for updating the system data of the software framework;

A log system service is used for generating a system log of the software framework;

A system monitoring service is used for monitoring the state of the preset services in the software framework.

For example, the data update service can be set based on actual needs, such as being set as over the air technology (OTA), which is not limited in this embodiment.

In this embodiment, by abstracting the capabilities of each device into each service in the preset software framework, the communication of the capabilities of each device can be realized through the communication between each service. The interfaces and contracts defined between each service are independent of the hardware platform, operating system and programming language that realize the service, therefore, the services built in the preset software framework can interact in a unified and universal way, so that the decoupling of business development can be realized, and then the workload of gateway development can be reduced, which is conducive to the subsequent expansion of gateway capabilities, and can facilitate the later maintenance of the gateway. Moreover, because the data bus is built in the preset software framework in advance, the information interaction between the first device service and the second device service under the gateway device can be realized based on the data bus, which can greatly simplify the application development logic in the gateway, so that the development of each application needs to pay attention to its own algorithm logic, and the data transmission inside the gateway is unified to the data bus, realizing the decoupling of information transmission.

Figure 1C:
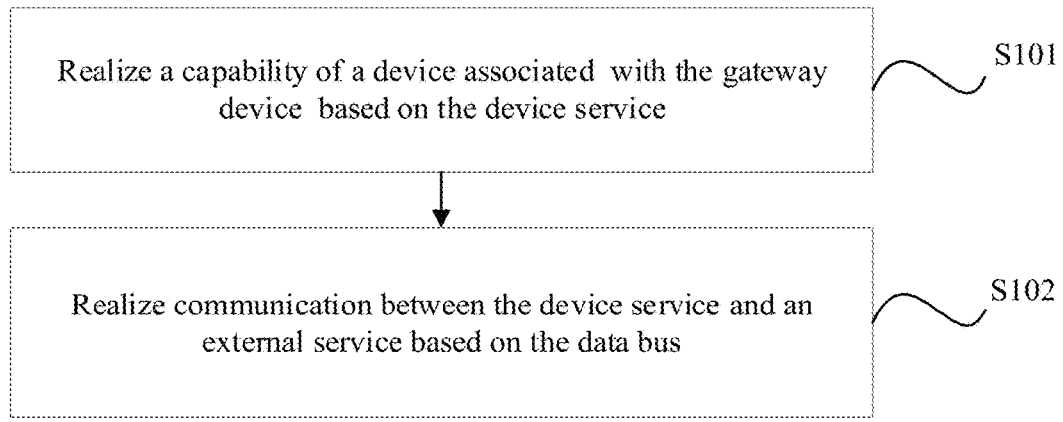
FIG. 1C is a flowchart of a method for operating a software framework shown according to an embodiment of the present disclosure.

FIG. 1C is a flowchart of a method for operating a software framework shown according to an embodiment of the present disclosure; The method of this embodiment is applied to a software framework, which is applicable to gateway devices. The software framework includes an application service layer and a basic service layer. The application service layer includes at least one device service registered in advance, and the basic service layer includes a data bus built in advance. As shown in FIG. 1C, the method includes the following steps S101-S102:

In step S101, a capability of a device associated with the gateway device is realized based on the device service;

In step S102, the communication between the device service and an external service is realized based on the data bus, and the external service is a device service belonging to a same gateway device as the device service or a different gateway device with the device service.

For example, the device service may include at least one of AUTO service, BT GW service, Wi-Fi GW service and service gateway.

AUTO service is used to provide automation capability. BT GW service is used to provide Bluetooth gateway capability. Wi-Fi GW service is used to provide Wi Fi gateway capability. The service gateway is used to provide gateway services of the current gateway device, which is not limited in this embodiment.

In some embodiments, the above method may further include:

Based on the data bus, the invocation of the external service to the device service is realized by means of subscribing to or publishing a preset topic. For example, the preset topic may include at least one of the transmission range of the current information, the receiver identification information of the current information (e.g., information such as the name of the device service) and the message type of the current information.

In this embodiment, the topics subscribed or published between various device services may be divided into local topics and global topics. Among them, the transmission range of local topics may be within a same gateway device, while the transmission range of global topics may be different gateway devices, that is, to achieve cross-device transmission. For example, the general format of the topic of this embodiment may be:

${domain_name}/${service_name}/${service_defined}/xxx.

It can be seen that, "/" can be used for content segmentation in the general format of topics, among which: ${domain_name} can be used to distinguish the scope of topics, and information such as device ID can be used for cross-device addressing; or, the reserved domain name "local" may be used to represent the transmission range between services under the local gateway; "${service_name}" is the service name, which can be used to distinguish each service; "${service_defined}/xxx" is a customized interface for services. Further, the following rule symbols "+" and "#" for matching topics are further defined in this embodiment. Specifically, "+" can be used for single-layer matching of topics, which can be placed at the middle or last level of subscribed topics, that is, when matching topics, the level of "+" is matched; And, "#" can be used for multi-level matching of topics, which can be placed at the end of the subscription topic, that is, when matching topics, it can be matched to the level of "#" and all subsequent levels. Understandably, when the topic is successfully matched, it can be determined that the current topic is the topic subscribed by the service, and then the information corresponding to the topic can be transmitted to the service.

In some embodiments, the above method may further include:

Based on the data bus, other gateway devices around the gateway device are discovered and networked with. For example, after each gateway device is powered on, it may first find out actively whether there is a master hub device around it (for example, through the user datagram protocol UDP multicast mode, which is not limited in this embodiment): if there is a master hub device, it can connect to the master hub device through an external data bus; if there is no master hub device, it may start the election process, that is, each device can multicast its own device attribute information profile (that is, some attributes of the device itself, including its own ability, election priority and other information), and listen to the device attribute information profile of other devices at the same time; then, when it is found that the election priority of other devices is higher, it may exit the election; if no device with higher priority is found within the set time (such as 30 s, etc.), it can upgrade itself to be the main hub device, and then realize the networking centered on the main hub device.

In some embodiments, the above method may further include:

Based on the data bus, the security of other gateway devices is verified by means of verifying digital certificates before establishing communication connections with other gateway devices. Among them, the issuance and authentication process of digital certificates s may be referred to the explanation and description in related art, which is not limited in this embodiment.

In some embodiments, the above method may further include at least one of the following steps:

System data of the software framework is stored based on the data storage service in the basic service layer;
System data of the software framework is updated based on the data update service in the basic service layer;
A system log of the software framework is generated based on the log system service in the basic service layer;
A state of the preset services in the software framework is monitored based on the system monitoring services in the basic service layer.

For example, the above data update service can be set based on actual needs, such as being set as over the air technology (OTA), which is not limited in this embodiment.

In this embodiment, by abstracting the capabilities of each device into each service in the preset software framework, the communication of the capabilities of each device can be realized through the communication between each service. The interfaces and contracts defined between each service are independent of the hardware platform, operating system and programming language that realize the service, therefore, the services built in the preset software framework can interact in a unified and universal way, so that the decoupling of business development can be realized, and then the workload of gateway development can be reduced, which is conducive to the subsequent expansion of gateway capabilities, and can facilitate the later maintenance of the gateway. Moreover, because the data bus is built in the preset software framework in advance, the information interaction between the first device service and the second device service under the gateway device can be realized based on the data bus, which can greatly simplify the application development logic in the gateway, so that the development of each application needs to pay attention to its own algorithm logic, and the data transmission inside the gateway is unified to the data bus, realizing the decoupling of information transmission.

Figure 1D:
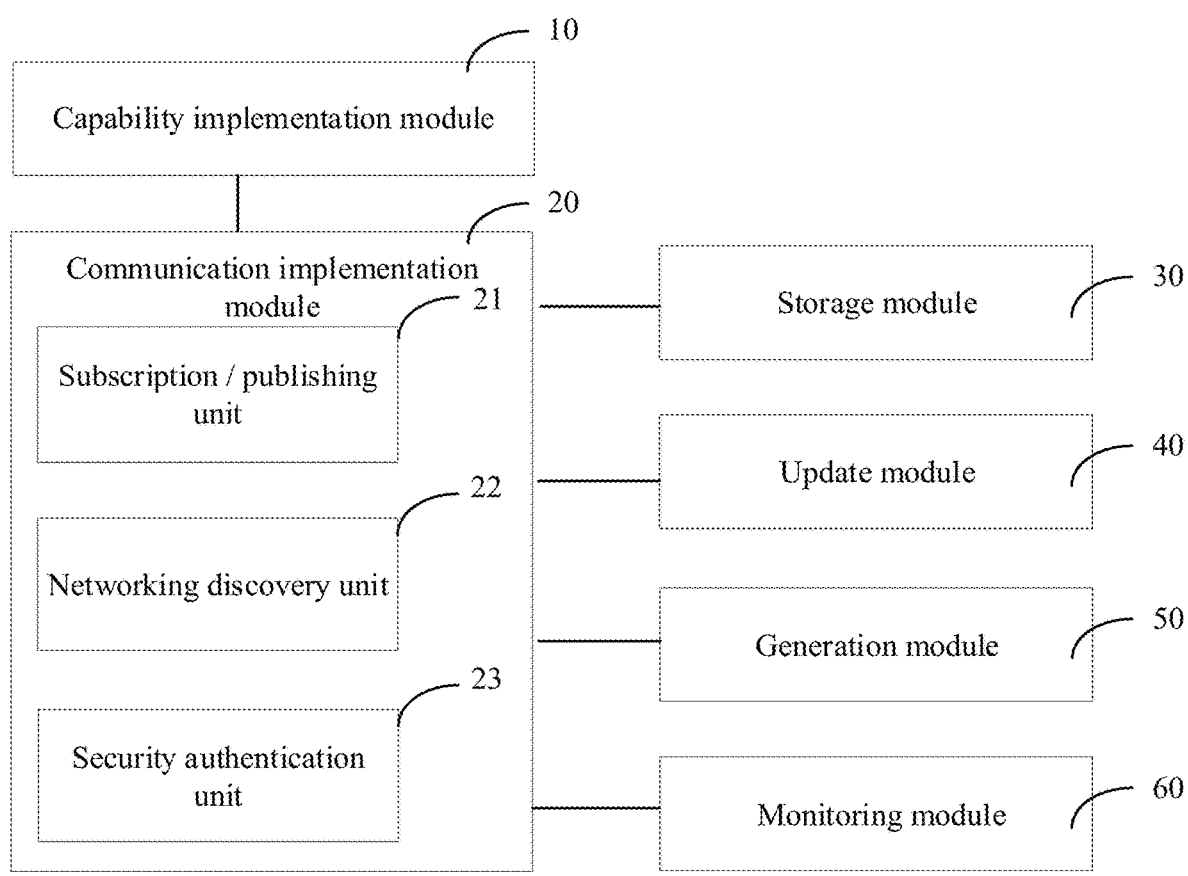
FIG. 1D is a block diagram of an apparatus for operating a software framework shown according to an embodiment of the present disclosure.

FIG. 1D is a block diagram of an apparatus for operating of a software framework shown according to an embodiment of the present disclosure. The apparatus of this embodiment is applied to a software framework, which is applicable to gateway devices. The software framework includes an application service layer and a basic service layer. The application service layer includes at least one device service registered in advance, and the basic service layer includes a data bus built in advance. As shown in FIG. 1D, the apparatus can include: a capability implementation module 10 and a communication implementation module 20; Of which:

The capability implementation module 10 is used to realize a capability of a device associated with the gateway device based on the device service;

The communication implementation module 20 is used to realize the communication between the device service and an external service based on the data bus. The external service is the device service belonging to a same gateway device as the device service or a different gateway device with the device service.

In some embodiments, the communication implementation module 20 may further include:

A subscription/publishing unit 21, configured to realize invocation of the external service to the device service by subscribing to or publishing a preset topic based on the data bus.

In some embodiments, the communication implementation module 20 may further include:

A networking discovery unit 22, configured to discover other gateway devices around the gateway device based on the data bus and networking with the discovered other gateway devices.

In some embodiments, the communication implementation module 20 may further include:

A security authentication unit 23, configured to verify the security of other gateway devices by verifying digital certificates before establishing a communication connection with other gateway devices based on the data bus.

In some embodiments, the above device may further include at least one of the following modules:

A storage module 30, configured to store the system data of the software framework based on the data storage service in the basic service layer;

An update module 40, configured to update the system data of the software framework based on the data update service in the basic service layer;

A generation module 50, configured to generate the system log of the software framework based on the log system service in the basic service layer;

The monitoring module 60, configured to monitor the state of the preset services in the software framework based on the system monitoring services in the basic service layer.

As for the apparatus in the above embodiment, the specific mode of operation of each module has been described in detail in the embodiment of the method, and will not be described in detail here.

Figure 2:
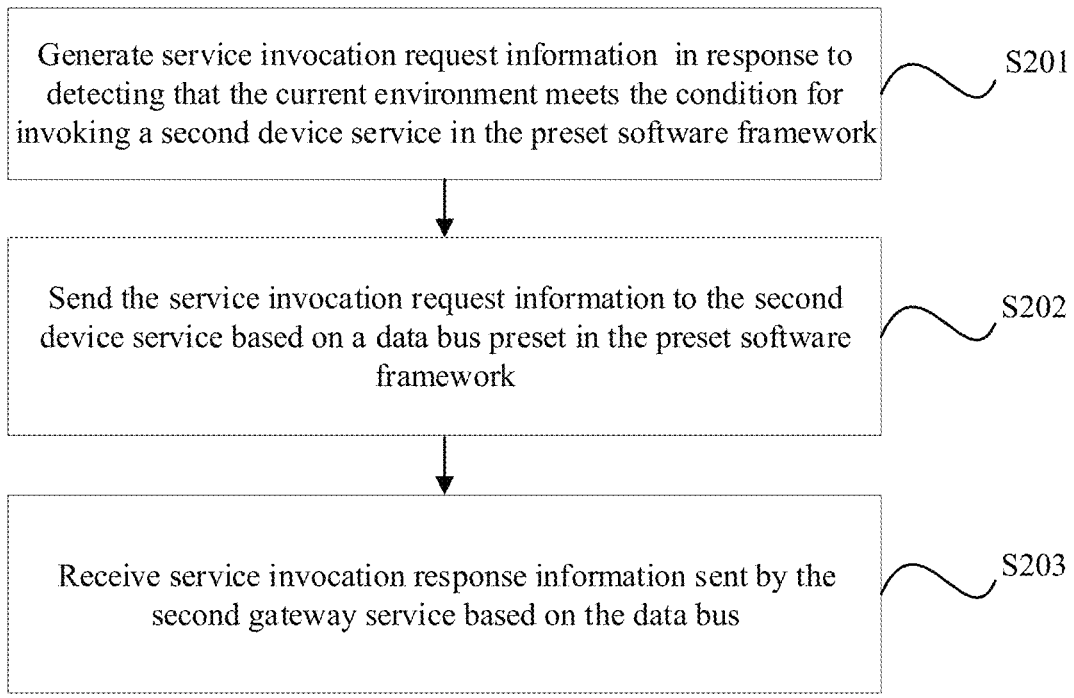
FIG. 2 is a flowchart of a method for invoking a service according to an embodiment of the present disclosure.

FIG. 2 is a flowchart of a method for invoking a service according to an embodiment. The method of this embodiment is applied to a first device service in the preset software framework, which is applicable to gateway devices. The preset software framework includes a plurality of device services registered in advance, and each device service corresponds to a capability of the device associated with the gateway device in the current environment.

As shown in FIG. 2, the method includes the following steps S201-S203:

In step S201, service invocation request information is generated in response to detecting that the current environment meets the condition for invoking a second device service in the preset software framework;

In step S202, the service invocation request information is sent to the second device service based on a data bus preset in the preset software framework;

In step S203, service invocation response information sent by the second gateway service based on the data bus is received.

Among them, the service invocation response information includes the information generated based on an obtained processing result after the second device service performs processing on the received service invocation request information.

In this embodiment, the above service invocation request information can include information generated by the first device service in response to detecting that the current environment meets the condition for invoking the second device service, such as RPC (remote procedure call) request, which is limited in this embodiment. The first device service corresponds to the first capability of the first device, the second device service corresponds to the second capability of the second device, and the gateway device is associated with the first device and the second device (that is, both the first device and the second device are devices under the first gateway device).

The above service invocation response information includes the information generated based on the processing result obtained after the second device service performs processing on the received service invocation request information.

For example, the flow of the method for invoking a service in this embodiment can include the following steps (1)-(4):

(1) When the first device service in the preset software framework detects that the condition for invoking the second device service are currently met, the service invocation request information can be generated. Among them, the current condition that meet the condition for invoking the second device service can include the current condition that meet the condition for controlling the second device to exert its second capability. For example, assuming that the first device is an infrared sensor and the second device is a door lamp, accordingly, the first device service is the corresponding infrared sensing service in the preset software framework, and the second device service is the door lamp lighting service in the preset software framework. When the first device detects that a user has walked in front of the door, it can be determined that the current condition for invoking the second device for lighting are met, that is, the first device service can detect that the current condition for invoking the second device service are currently met.

In some embodiments, the first device service can generate service invocation request information based on a service query result obtained in advance, including the result obtained by querying the services in the preset software framework in advance, in response to detecting that the current environment meets the condition for invoking the second device service in the preset software framework. Among them, the first device service can send a query message for querying the second device service to the data bus when the gateway device starts and/or detects that the current environment meets the condition for invoking the second device service in the preset software framework, and then determine the existence of the second device service when receiving the relevant information of the second device service replied by the data bus. When the relevant information of the second device service replied by the data bus is not received within the set time, it can be determined that the second device service does not exist.

(2) After generating the service invocation request information, the first device service can send the service invocation request information to the second device service based on the data bus in the preset software framework.

(3) After receiving the service invocation request information, the second device service can perform processing based on the received service invocation request information, and generate the service invocation response information based on the obtained processing result. Among them, the service invocation response information can include information processing result, which can include feedback information generated after the completion of the service invocation or feedback information generated when the service invocation cannot be completed, which is not limited in this embodiment.

(4) After generating the service invocation response information, the second device service can send the service invocation response information to the first device service based on the data bus. Then, when the first device service receives the service invocation response information, one invocation of service is completed.

It can be seen from the above description that the method of this embodiment generates service invocation request information in response to detecting that the current environment meets the condition for invoking the second device service in the preset software framework, and sends the service invocation request information to the second device service based on the preset data bus in the preset software framework, and then receives the service invocation response information sent by the second gateway service based on the data bus. The service invocation response information includes the information generated based on the processing result after the second device service performs processing on the received service invocation request information. As the capabilities of each device are abstracted into each service in the preset software framework, the communication of the capabilities of each device can be realized through the communication between various services. Furthermore, the interfaces and contracts defined between various services are independent of the hardware platform, operating system and programming language that realize the services, therefore, the services built in the preset software framework can interact in a unified and common way, so that the decoupling of business development can be realized, and then the workload of gateway development can be reduced, which is conducive to the subsequent expansion of the gateway capability, and can facilitate the later maintenance of the gateway.

Moreover, as the data bus is built in the preset software framework in advance, the information interaction between the first device service and the second device service under the gateway device can be realized based on the data bus, which can greatly simplify the application development logic in the gateway, so that the development of each application needs to pay attention to its own algorithm logic, and the data transmission inside the gateway is unified to the data bus, realizing the decoupling of information transmission.

Figure 3:
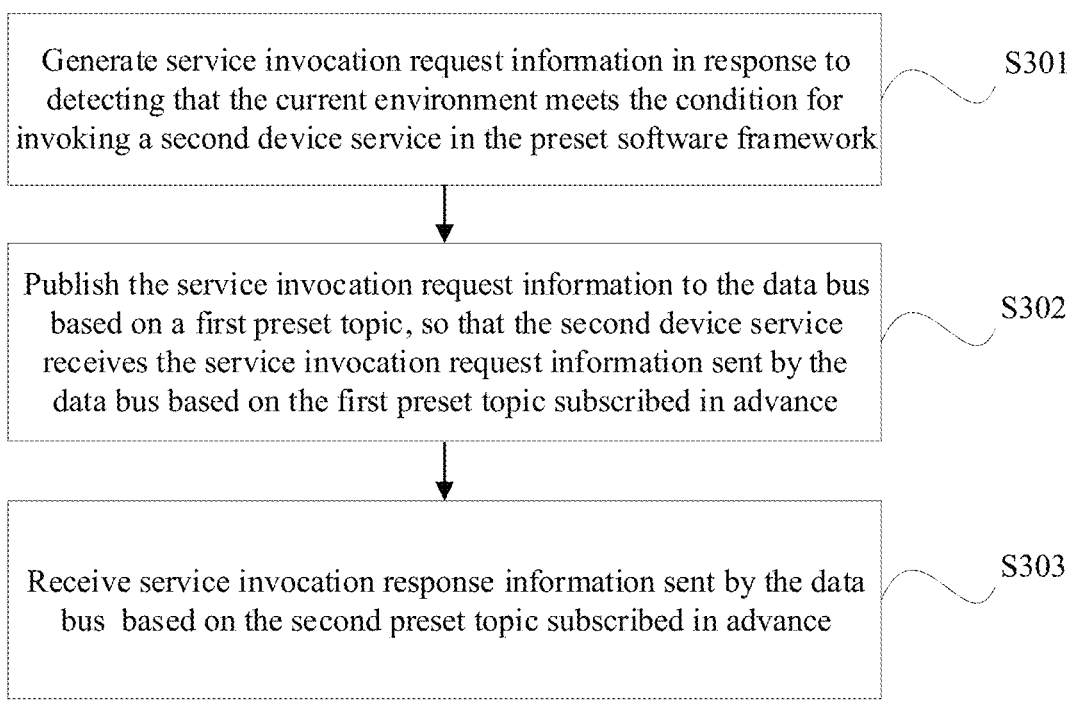
FIG. 3 is a flowchart of another method for invoking a service according to an embodiment of the present disclosure.

FIG. 3 is a flowchart of another method for invoking a service according to an embodiment of the present disclosure. The method of this embodiment is applied to a first device service in the preset software framework, which is applicable to gateway devices. The preset software framework includes a plurality of device services registered in advance, and each device service corresponds to a capability of the device associated with the gateway device in the current environment.

As shown in FIG. 3, the method includes the following steps S301-S303:

In step S301, in response to detecting that the current environment meets the condition for invoking a second device service in the preset software framework, service invocation request information is generated;

In step S302, the service invocation request information is published to the data bus based on a first preset topic, so that the second device service receives the service invocation request information sent by the data bus based on the first preset topic subscribed in advance;

Among them, the first preset topic can include at least one of the transmission range of the service invocation request information, the receiver identification information of the service invocation request information (such as the name of the second device service) and the message type of the service invocation request information.

In step S303, service invocation response information sent by the data bus is received based on the second preset topic subscribed in advance.

Among them, the above service invocation response information can include the information generated by the second device service based on the obtained processing result and published to the data bus based on the second preset topic after the second device service performs processing on the received service invocation request information. The second preset topic includes at least one of the transmission range of the service invocation response information, the receiver identification information of the service invocation response information (such as the name of the first device service and other information) and the message type of the service invocation response information.

Among them, the service invocation response information includes the information generated based on the obtained processing result after the second device service performs processing on the received service invocation request information.

The relevant explanation and description of the above step S301, may be referred to step S201 in the embodiment shown in FIG. 2 above, which will not be repeated here.

In this embodiment, when the first gateway service detects that the service invocation request information matches the topic subscribed by the second device service, it can send the service invocation request information to the second gateway service to which the second device service belongs, so as to realize that the service invocation request information is sent to the second device service through the second gateway service subsequently.

It is worth noting that, among the services in the preset software framework, the corresponding services can be invoked by subscribing to or publishing preset topics. It is understandable that the communication between services by means of publishing or publishing can reduce invalid data transmission, that is, each service receives the data it subscribes to, without receiving all the data and filtering out the data it needs, so it can improve the efficiency of information transmission and reduce traffic consumption.

For example, under a same gateway service, service A can subscribe to the topic it needs in advance. When service B publishes the information of the topic, the data bus can send the information of the topic published by service B to service A. In some embodiments, topics subscribed or published between services can be divided into local topics and global topics. Among them, the transmission range of local topics can be within the same gateway device, while the transmission range of global topics can be different gateway devices, that is, to achieve cross-device transmission. For example, the general format of the topic of this embodiment may be:

${domain_name}/${service_name}/${service_defined}/xxx.

It can be seen that, "/" can be used for content segmentation in the general format of topics, among which: ${domain_name} can be used to distinguish the scope of topics, and information such as device ID can be used for cross-device addressing; or, the reserved domain name "local" may be used to represent the transmission range between services under the local gateway; "${service_name}" is the service name, which can be used to distinguish each service; "${service_defined}/xxx" is a customized interface for services. Further, the following rule symbols "+" and "#" for matching topics are further defined in this embodiment. Specifically, "+" can be used for single-layer matching of topics, which can be placed at the middle or last level of subscribed topics, that is, when matching topics, the level of "+" is matched; And, "#" can be used for multi-level matching of topics, which can be placed at the end of the subscription topic, that is, when matching topics, it can be matched to the level of "#" and all subsequent levels. Understandably, when the topic is successfully matched, it can be determined that the current topic is the topic subscribed by the service, and then the information corresponding to the topic can be transmitted to the service.

Figure 4:
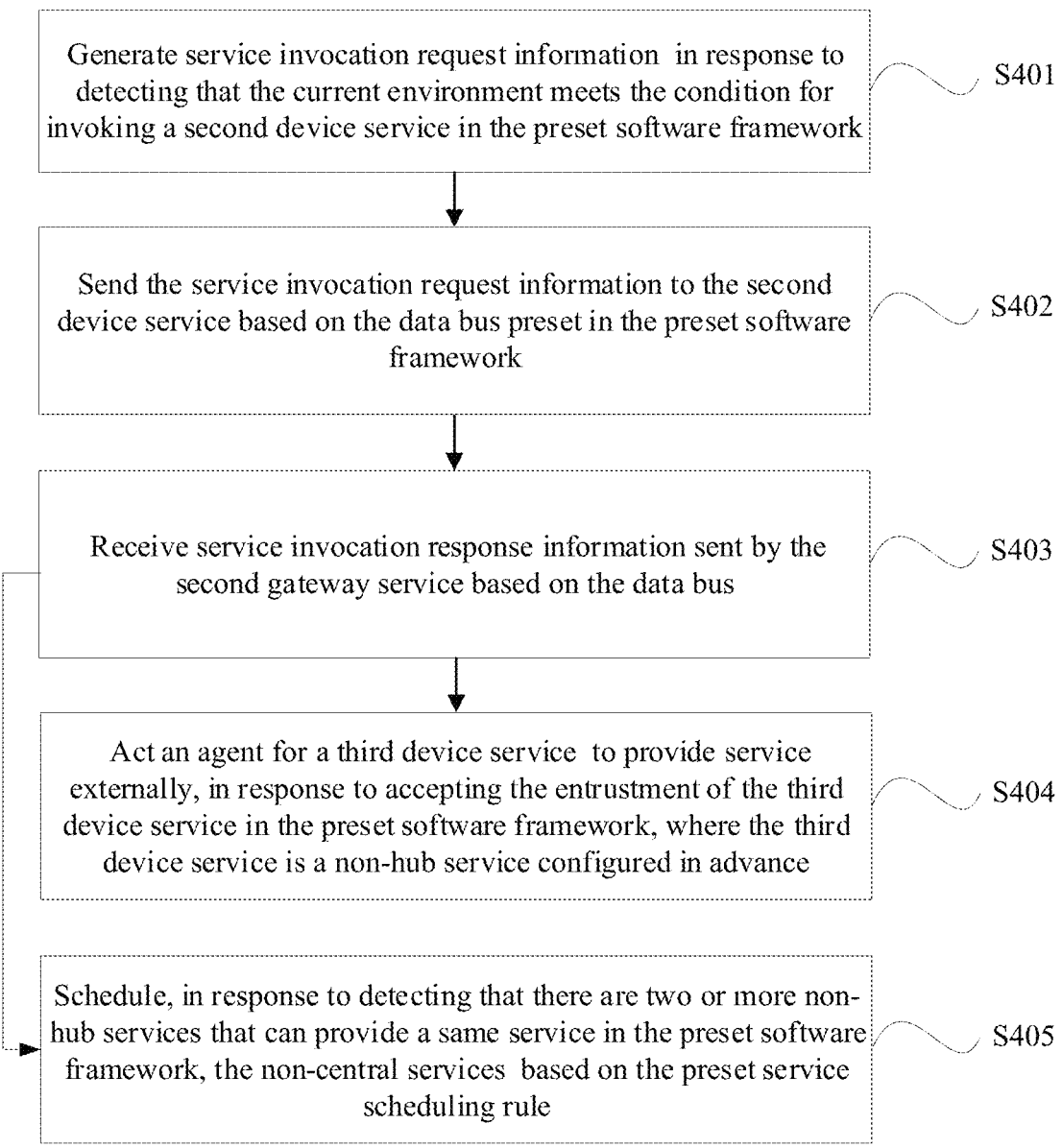
FIG. 4 is a flowchart of another method for invoking a service according to an embodiment of the present disclosure.

FIG. 4 is a flowchart of another method for invoking a service according to an embodiment of the present disclosure. The method of this embodiment is applied to a first device service in the preset software framework, which is applicable to gateway devices. The preset software framework includes a plurality of device services registered in advance, and each device service corresponds to a capability of a device associated with the gateway device in the current environment.

In this embodiment, the first device service can be a hub service configured in advance, which can be used to act as an agent for other non-hub services under the current gateway, and/or to schedule a plurality of non-hub services that can provide a same service based on the preset service scheduling rule, so as to balance the load of each non-hub service. Specifically, as shown in FIG. 4, the method includes the following steps S401-S405:

In step S401, service invocation request information is generated in response to detecting that the current environment meets the condition for invoking a second device service in the preset software framework;

In step S402, the service invocation request information is sent to the second device service based on the data bus preset in the preset software framework;

In step S403, service invocation response information sent by the second gateway service based on the data bus is received, and the service invocation response information includes the information generated based on the obtained processing result after the second device service perform processing the received service invocation request information;

In step S404, in response to accepting the entrustment of a third device service in the preset software framework, the third device service is agented to provide service externally, and the third device service is a non-hub service configured in advance;

In step S405, in response to detecting that there are two or more non-hub services that can provide a same service in the preset software framework, the non-central services are scheduled based on the preset service scheduling rule.

The relevant explanations and descriptions of the above steps S401-S403 can be referred to steps S201-S203 shown in FIG. 2 above, and will not be repeated here.

In some embodiments, the non-hub service in the preset software framework can entrust the hub service (that is, the first device service) to provide services externally by means of agency. For example, the hub service can act as an agent for the non-hub service and undertake the responsibility of subscribing to/publishing messages, while the handler of the actual service can still be the non-hub service itself. For example, the hub service can send out the service request information of subscribing to the preset topic based on the service capability of the non-hub service, and then when receiving the service request information of the preset topic published by other services, the hub service can forward the information to the non-hub service. When the non-hub service completes the information processing and generates the service response information based on the processing result, the hub service can publish the service response information, so that other services can receive the service response information based on the pre-subscribed topic.

In other embodiments, the above hub service can also determine that when there are two or more non-hub services that can provide a same service in the preset software framework, the non-hub service can be scheduled based on the preset service scheduling rule (such as the scheduling rule of load balancing, etc.). For example, the hub service can obtain the current state of each non-hub service in advance (such as occupied state or idle state, etc.); and then, when receiving the service request information for invoking the target service, the service request information can be sent to the non-hub service currently in the idle state in priority, which can balance the load of each non-hub service, and then improve the efficiency of service invocation.

Figure 5:
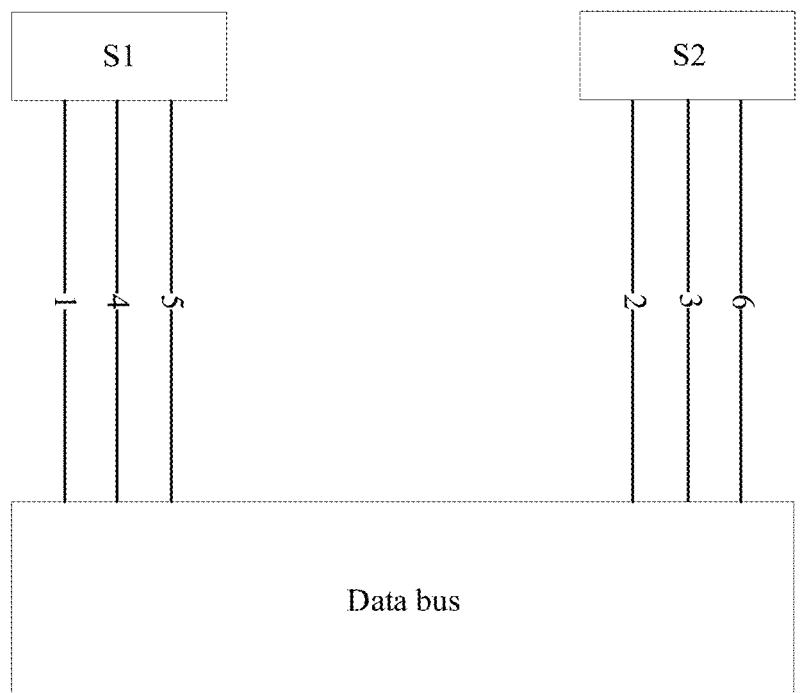
FIG. 5 is a schematic diagram of an application scenario of a method for invoking a service according to an embodiment of the present disclosure.

FIG. 5 is a schematic diagram of an application scenario of a method for invoking a service according to an embodiment of the present disclosure. Based on the above embodiments, this embodiment takes service S2 accessing service S1 under a same gateway device as an example to illustrate the method for invoking service in the embodiment of this disclosure. As shown in FIG. 5, the flow of this method includes the following steps 1-6:

1. The service S1 subscribes to the topic of "local/s1/rpc/request" to provide an RPC request interface externally, that is, when other services under the same gateway publish the RPC request information of this topic, it will be forwarded to the service S1;
2. The service S2 subscribes to the topic of "local/s2/rpc//response" to provide an RPC response interface externally, that is, when other services publish the RPC response reply information of this topic, it will be forwarded to the service S2;
3. The service S2 publishes a RPC request with the topic of "local/s1/rpc/request" and provides the RPC response topic of "local/s2/rpc/response", where "{id: 123, method:" "}" can be a data packet with of the topic, indicating that the message id is "123" and the specific method of the service is " " (here is the default);
4. The service S1 will perform processing on the RPC request after receiving it through the internal data bus;

It is understandable that there is a subscription/publishing module (not shown in the figure) in the data bus, which is used to realize the information subscription and information publishing of various services.

5. The service S1 publishes the processing result to the response topic of "local/s2/rpc/response";
6. The service S2 receives the above processing result through the internal data bus, and thus one RPC service invocation is completed.

It can be seen from the above description that the embodiments of the present disclosure can realize the invocation between services within a same gateway and improve the scalability and reusability of the code due to the adoption of a service-oriented preset software framework. On the other hand, the introduction of data bus can greatly simplify the information transmission channel between services and simplify the application development logic, so that the application development needs to pay attention to its own logic and hand over the data transmission to the message bus. In addition, by adopting the concept of domain control in the theme format, the security of the service gateway and the whole system can be improved.

Figure 6:
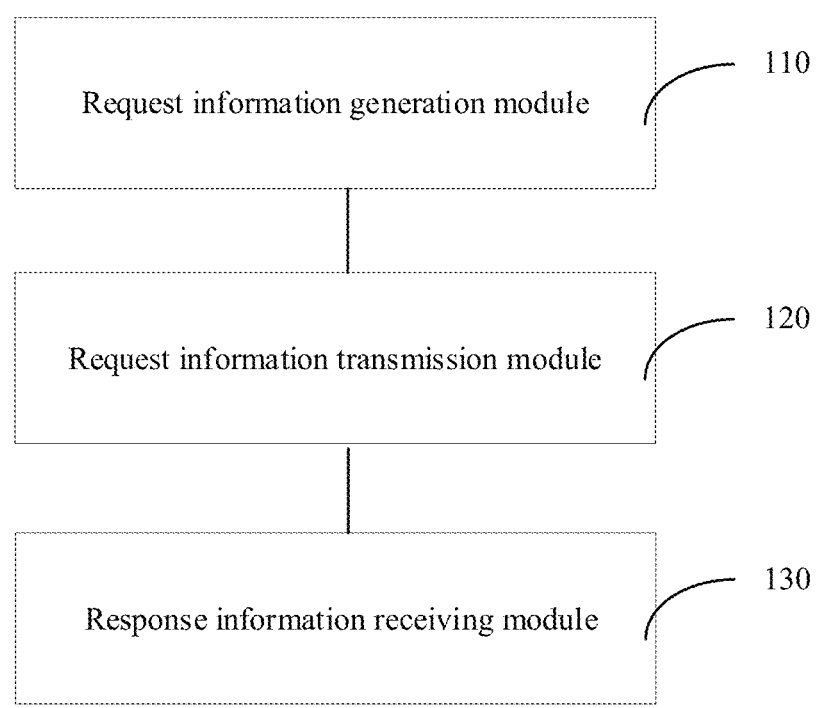
FIG. 6 is a block diagram of an apparatus for invoking a service according to an embodiment of the present disclosure.

FIG. 6 is a block diagram of an apparatus for invoking a service according to an embodiment. The apparatus of this embodiment is applied to a first device service in the preset software framework, which is applicable to gateway devices. The preset software framework includes a plurality of device services registered in advance, and each device service corresponds to a capability of a device associated with the gateway device in the current environment. As shown in FIG. 6, the apparatus may include a request information generation module 110, a request information transmission module 120, and a response information receiving module 130, where:

The request information generation module 110 is used to generate service invocation request information in response to detecting that the current environment meets the condition for invoking a second device service in the preset software framework;

The request information sending module 120 is used to send the service invocation request information to the second device service based on a preset data bus in the preset software framework;

The response information receiving module 130 is used to receive service invocation response information sent by the second gateway service based on the data bus. The service invocation response information includes the information generated based on the obtained processing result after the second device service perform processing on the received service invocation request information.

It can be seen from the above description that the apparatus of this embodiment generates service invocation request information in invoking a second device service in the preset software framework, and sends the service invocation request information to the second device service based on the preset data bus in the preset software framework, and then receives the service invocation response information sent by the second gateway service based on the data bus. The service invocation response information includes the information generated based on the processing result after the second device service performs processing on the received service invocation request information. As the capabilities of each device are abstracted into each service in the preset software framework, then, the communication of the capabilities of each device can be realized through the communication between various services. And, the interfaces and contracts defined between various services are independent of the hardware platform, operating system and programming language that realize the services. Therefore, the services built in the preset software framework can interact in a unified and common way, so that the decoupling of business development can be realized, and then the workload of gateway development can be reduced, which is conducive to the subsequent expansion of the gateway capability, and can facilitate the later maintenance of the gateway.

Moreover, since the data bus is built in the preset software framework in advance, the information interaction between the first device service and the second device service under the gateway device can be realized based on the data bus, which can greatly simplify the application development logic in the gateway, so that the development of each application needs to pay attention to its own algorithm logic, and the data transmission inside the gateway is unified to the data bus, realizing the decoupling of information transmission.

Figure 7:
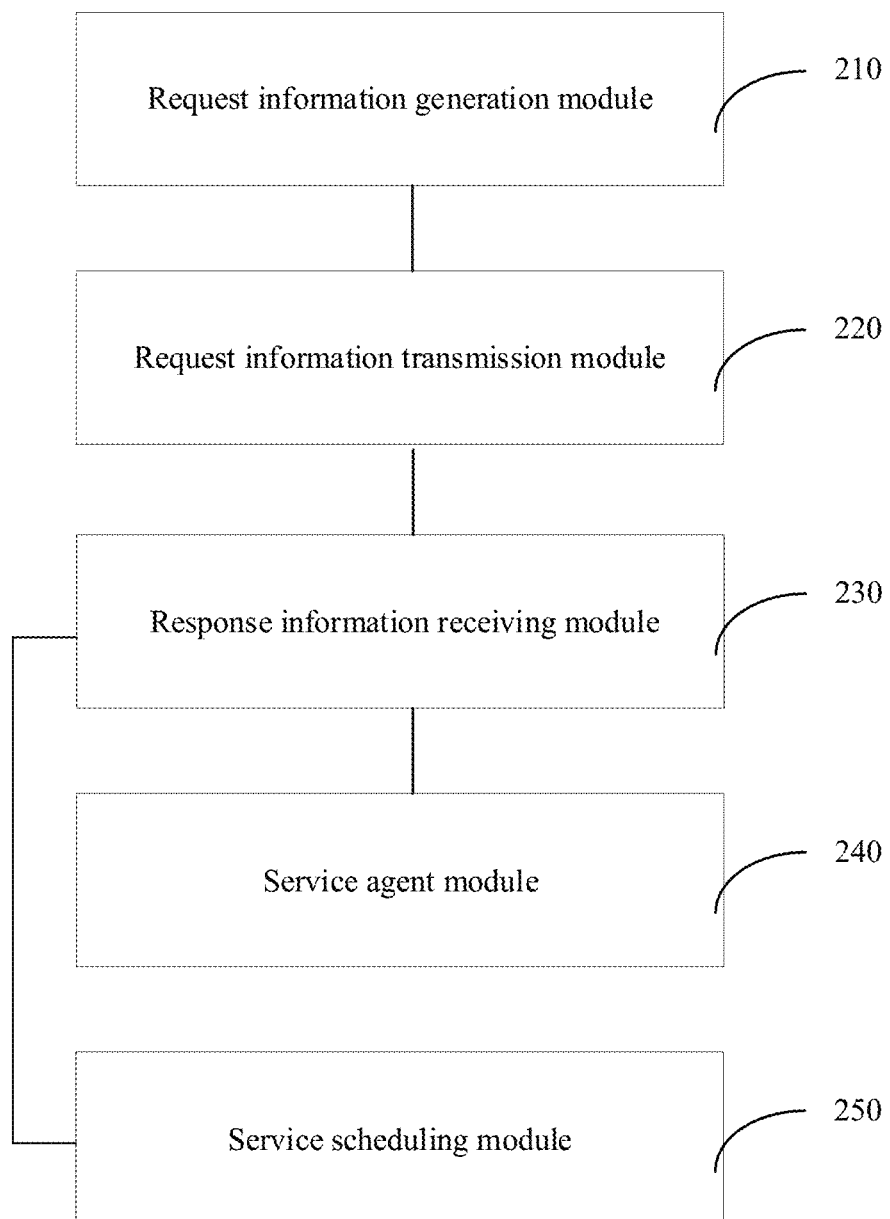
FIG. 7 is a block diagram of another apparatus for invoking a service according to an embodiment of the present disclosure.

FIG. 7 is a block diagram of an apparatus for invoking a service according to another embodiment. The device of this embodiment is applied to a first device service in the preset software framework, which is applicable to gateway devices. The preset software framework includes a plurality of device services registered in advance, and each device service corresponds to a capability of a device associated with the gateway device in the current environment. Among them, the request information generation module 210, the request information transmission module 220 and the response information reception module 230 have the same capabilities as the request information generation module 110, the request information transmission module 120 and the response information reception module 130 in the embodiment shown in FIG. 6 above, and will not be repeated here.

As shown in FIG. 7, the request information sending module 220 in this embodiment can be further used to publish the service invocation request information to the data bus based on a first preset topic, so that the second device service receives the service invocation request information sent by the data bus based on the first preset topic subscribed in advance, where the first preset topic includes at least one of the transmission range of the service invocation request information, the receiver identification information of the service invocation request information and the message type of the service invocation request information.

In some embodiments, the response information receiving module 230 can be further used to receive the service invocation response information sent by the data bus based on the second preset topic subscribed in advance. The service invocation response information includes the information generated by the second device service based on the processing result and published to the data bus based on the second preset topic after the second device service performs processing on the received service invocation request information. The second preset topic includes at least one of the transmission range of the service invocation response information, the receiver identification information of the service invocation response information, and the message type of the service invocation response information.

In some embodiments, the request information generation module 210 can be further used to generate the service invocation request information based on the service query result obtained in advance, including the result obtained by querying the services in the preset software framework in advance, in response to detecting that the current environment meets the condition for invoking the second device services in the preset software framework.

In some embodiments, the first device service may be a hub service configured in advance;

Furthermore, the above apparatus can further include:

A service agent module 240, configured to act as an agent for a third device service to provide external service, in response to accepting the entrustment of the third device service in the preset software framework. The third device service is a non-hub service configured in advance.

In some embodiments, the first device service may be hub service configured in advance;

Furthermore, the above device can further include:

A service scheduling module 250, configured to schedule the non-hub services based on the preset service scheduling rule, in response to detecting that there are two or more non-hub services that can provide a same service in the preset software framework.

As for the apparatus in the above embodiment, the specific mode of operation of each module has been described in detail in the embodiments of the method, and will not be described in detail here.

Figure 8:
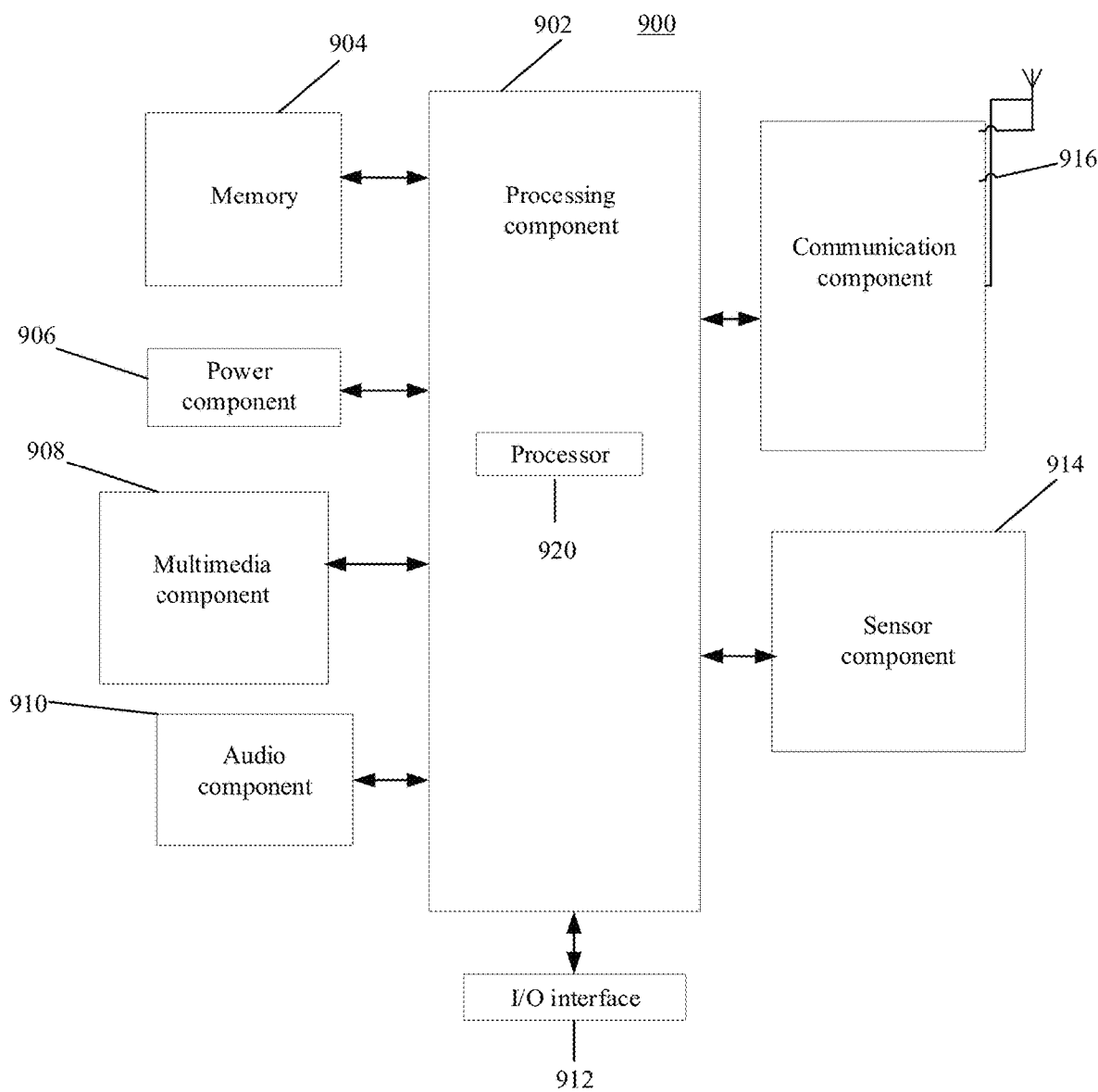
FIG. 8 is a block diagram of a gateway device shown according to an embodiment of the present disclosure.

FIG. 8 is a block diagram of a gateway device shown according to an embodiment. For example, the device 900 may be a mobile phone, a computer, a digital broadcasting terminal, a messaging device, a game console, a tablet device, a medical device, a fitness device, a personal digital assistant, etc.

Referring to FIG. 8, device 900 may include one or more of the following components: processing component 902, memory 904, power component 906, multimedia component 908, audio component 910, input/output (I/O) interface 912, sensor component 914, and communication component 916.

The processing component 902 typically controls the overall operation of the device 900, such as operations associated with display, phone call, data communication, camera operation, and recording operation. The processing component 902 may include one or more processors 920 to execute instructions to complete all or part of the steps of the method described above. In addition, the processing component 902 may include one or more modules to facilitate the interaction between the processing component 902 and other components. For example, the processing component 902 may include a multimedia module to facilitate interaction between the multimedia component 908 and the processing component 902.

The memory 904 is configured to store various types of data to support operations at the device 900. Examples of these data include instructions for any application or method operating on the device 900, contact data, phonebook data, messages, pictures, videos, and the like. The memory 904 may be implemented by any type of volatile or nonvolatile storage device or their combination, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

Power component 906 provides power to various components of device 900. Power component 906 may include a power management system, one or more power supplies, and other components associated with generating, managing, and distributing power to device 900.

The multimedia component 908 includes a screen that provides an output interface between the device 900 and the user. In some embodiments, the screen may include a liquid crystal display (LCD) and a touch panel (TP). If the screen includes a touch panel, the screen can be implemented as a touch screen to receive input signals from the user. The touch panel includes one or more touch sensors to sense touch, sliding, and gestures on the touch panel. The touch sensor can sense the boundary of the touch or slide action, and detect the duration and pressure related to the touch or slide operation. In some embodiments, the multimedia component 908 includes a front camera and/or a rear camera. When the device 900 is in an operation mode, such as shooting mode or video mode, the front camera and/or rear camera can receive external multimedia data. Each front camera and rear camera can be a fixed optical lens system or have focal length and optical zoom capabilities.

The audio component 910 is configured to output and/or input audio signals. For example, the audio component 910 includes a microphone (MIC) that is configured to receive external audio signals when the device 900 is in an operating mode, such as a call mode, a recording mode, and a speech recognition mode. The received audio signal may be further stored in the memory 904 or transmitted via the communication component 916. In some embodiments, the audio component 910 also includes a speaker for outputting an audio signal.

The I/O interface 912 provides an interface between the processing component 902 and the peripheral interface module, which can be keyboard, click wheel, button, etc. These buttons can include but are not limited to, home button, volume button, start button and lock button.

Sensor component 914 includes one or more sensors for providing various aspects of condition assessment for device 900. For example, the sensor component 914 can detect the open/close state of the device 900, the relative positioning of the components, such as the display and keypad of the device 900. The sensor component 914 can also detect the position change of the device 900 or a component of the device 900, the presence or absence of the user's contact with the device 900, the orientation or acceleration/deceleration of the device 900, and the temperature change of the device 900. The sensor component 914 may also include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an acceleration sensor, a gyroscope sensor, a magnetic sensor, a pressure sensor, or a temperature sensor.

The communication component 916 is configured to facilitate wired or wireless communication between the device 900 and other devices. Device 900 can access wireless networks based on communication standards, such as WiFi, 2G or 3G, 4G or 5g, or their combination. In an embodiment, the communication component 916 receives broadcast signals or broadcast related information from an external broadcast management system via a broadcast channel. In an embodiment, the communication component 916 also includes a near-field communication (NFC) module to facilitate short-range communication. For example, the NFC module can be implemented based on radio frequency identification (RFID) technology, infrared data association (IrDA) technology, ultrawide band (UWB) technology, Bluetooth (BT) technology and other technologies.

In an embodiment, device 900 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components for performing the above methods.

In an embodiment, there is also provided a non-transitory computer-readable storage medium including instructions, such as the memory 904 including instructions, which can be executed by the processor 920 of the device 900 to complete the above method. For example, the non-transitory computer-readable storage medium may be ROM, random access memory (RAM), CD-ROM, magnetic tape, floppy disk and optical data storage device, etc.

After considering the disclosure disclosed here in the specification and practice, those skilled in the art will easily think of other embodiments of the disclosure. The present disclosure is intended to cover any variation, use or adaptation of the present disclosure, which follows the general principles of the present disclosure and includes common general knowledge or frequently used technical means in the technical field not disclosed in the present disclosure. The description and the embodiments are regarded as exemplary, and the true scope and spirit of the present disclosure are indicated by the following claims.

It may be understood that the present disclosure is not limited to the precise structure described above and shown in the drawings, and various modifications and changes may be made without departing from its scope. The scope of this disclosure is limited by the appended claims.

In order to overcome the problems existing in related art, the embodiments of the present disclosure provide a software framework, operation method, invoking service method, apparatus, device and medium to solve the defects in related art.

According to an aspect of the present disclosure, there is provided a software framework applicable to a gateway device. The software framework includes an application service layer and a basic service layer, the application service layer includes at least one device service registered in advance, and the basic service layer includes a data bus built in advance, where:
  the device service corresponds to a capability of a device associated with the gateway device; and
  the data bus is configured to realize the communication between the device service and an external service, and the external service includes a device service belonging to a same gateway device as the device service or a different gateway device with the device service.

In some embodiments, the data bus includes a subscription/publishing module.

The subscription/publishing module is configured to realize invocation of the external service to the device service by subscribing to or publishing a preset topic.

In some embodiments, the data bus includes a networking discovery module.

The networking discovery module is configured to discover another gateway device around the gateway device and network with the another gateway device.

In some embodiments, the data bus includes a security verification module.

The security verification module is configured to verify security of another gateway device by means of verifying a digital certificate before establishing communication connection with the another gateway device.

In some embodiments, the basic service layer further includes at least one of following services:
  a data storage service configured to store system data of the software framework;
  a data update service configured to update system data of the software framework;
  a log system service configured to generate a system log of the software framework;
  a system monitoring service configured to monitor a state of a preset service in the software framework.

According to an aspect of the present disclosure, there is provided a method for operating a software framework. The method is applied to a software framework, the software framework is applicable to a gateway device, the software framework includes an application service layer and a basic service layer, the application service layer includes at least one device service registered in advance, the basic service layer includes a data bus built in advance, and the method includes:
  realizing a capability of a device associated with the gateway device based on the device service; and
  realizing communication between the device service and an external service based on the data bus, where the external service includes a device service belonging to a same gateway device as the device service or a different gateway device with the device service.

In some embodiments, the method further includes:
  realizing invocation of the external service to the device service by means of subscribing to or publishing a preset topic based on the data bus.

In some embodiments, the method further includes:
  discovering another gateway device around the gateway device and networking with the another gateway device by based on the data bus.

In some embodiments, the method further includes:
  verifying security of another gateway device by means of verifying a digital certificate before establishing communication connection with the another gateway device based on the data bus.

In some embodiments, the method further includes at least one of the following acts:
  storing system data of the software framework based on a data storage service in the basic service layer;
  updating system data of the software framework based on a data update service in the basic service layer;
  generating a system log of the software framework based on a log system service in the basic service layer; and
  monitoring a state of a preset service in the software framework based on a system monitoring service in the basic service layer.

According to an aspect of the present disclosure, there is provided an apparatus of operating a software framework. The apparatus is applied to a software framework, the software framework is applicable to a gateway device, the software framework includes an application service layer and a basic service layer, the application service layer includes at least one device service registered in advance, the basic service layer includes a data bus built in advance, and the apparatus includes:
  a capability realization module, configured to realize a capability of a device associated with the gateway device based on the device service; and
  a communication implementation module, configured to realize communication between the device service and an external service based on the data bus, where the external service includes a device service belonging to a s same gateway device as the device service or a different gateway device with the device service.

In some embodiments, the communication implementation module further includes:
  a subscription/publishing unit for realizing invocation of the external service to the device service by subscribing to or publishing a preset topic based on the data bus.

In some embodiments, the communication implementation module further includes:
  a networking discovery unit for discovering another gateway device around the gateway device and networking with the another gateway device based on the data bus.

In some embodiments, the communication implementation module further includes:
  a security verification unit for verifying security of another gateway device by means of verifying a digital certificate before establishing communication connection with the another gateway device based on the data bus.

In some embodiments, the apparatus further includes at least one of following modules:
  a storage module configured to store system data of the software framework based on a data storage service in the basic service layer;
  an update module configured to update system data of the software framework based on a data update service in the basic service layer;
  a generation module configured to generate a system log of the software framework based on a log system service in the basic service layer; and
  a monitoring module configured to monitor a state of a preset service in the software framework based on a system monitoring service in the basic service layer.

According to an aspect of the present disclosure, there is provided a method for invoking a service. The method is applied to a first device service in a preset software framework, the preset software framework is applicable to a gateway device, the preset software framework includes a plurality of device services registered in advance, and each of the device services corresponds to a capability of a device associated with the gateway device in current environment;

the method includes:
generating service invocation request information in response to detecting that the current environment meets a condition of invoking a second device service in the preset software framework;

sending the service invocation request information to the second device service based on a data bus preset in the preset software framework; and receiving service invocation response information sent by the second gateway service based on the data bus, where the service invocation response information includes information generated based on an obtained processing result after the second device service performs processing on the received service invocation request information.

In some embodiments, the sending the service invocation request information to the second device service based on the data bus preset in the preset software framework, includes:

publishing the service invocation request information to the data bus based on a first preset topic, causing the second device service to receive the service invocation request information sent by the data bus based on the first preset topic subscribed in advance, where the first preset topic includes at least one of transmission range of the service invocation request information, receiver identification information of the service invocation request information and message type of the service invocation request information.

In some embodiments, the receiving service invocation response information sent by the second gateway service based on the data bus includes:

receiving the service invocation response information sent by the data bus based on a second preset topic subscribed in advance, where the service invocation response information includes information generated based on an obtained processing result and published to the data bus based on the second preset topic, after the second device service performs processing on the received service invocation request information; and the second preset topic includes at least one of transmission range of the service invocation response information, receiver identification information of the service invocation response information, and message type of the service invocation response information.

In some embodiments, the generating the service invocation request information in response to detecting that the current environment meets the condition of invoking the second device service in the preset software framework, includes:

generating the service invocation request information based on a service query result obtained in advance, in response to detecting that the current environment meets the condition for invoking the second device service in the preset software framework, where the service query result includes a result obtained by querying a service in the preset software framework in advance.

In some embodiments, the first device service includes a hub service configured in advance;

the method further includes:
acting as an agent for a third device service to provide external service, in response to accepting entrustment of the third device service in the preset software framework, where the third device service includes a non-hub service configured in advance.

In some embodiments, the first device service includes a hub service configured in advance;

the method further includes:
scheduling, in response to detecting that the preset software framework includes two or more non-hub services capable of providing a same service, the non-hub services based on a preset service scheduling rule.

According to an aspect of the present disclosure, there is provided an apparatus for invoking a service. The apparatus is applied to a first device service in a preset software framework, the preset software framework is applicable to a gateway device, the preset software framework includes a plurality of device services registered in advance, each of the device services corresponds to a capability of a device associated with the gateway device in current environment;

the apparatus includes:
a request information generation module configured to generate service invocation request information in response to detecting that the current environment meets a condition of invoking a second device service in the preset software framework;

a request information sending module configured to send the service invocation request information to the second device service based on a data bus preset in the preset software framework; and a response information receiving module configured to receive service invocation response information sent by the second gateway service based on the data bus, where the service invocation response information includes information generated based on an obtained processing result after the second device service performs processing on the received service invocation request information.

In some embodiments, the request information sending module is further configured to publish the service invocation request information to the data bus based on a first preset topic, causing the second device service to receive the service invocation request information sent by the data bus based on the first preset topic subscribed in advance, where the first preset topic includes at least one of transmission range of the service invocation request information, receiver identification information of the service invocation request information and message type of the service invocation request information.

In some embodiments, the response information receiving module is further configured to receive the service invocation response information sent by the data bus based on a second preset topic subscribed in advance; the service invocation response information includes information generated based on an obtained processing result and published to the data bus based on the second preset topic, after the second device service performs processing on the received service invocation request information; and the second preset topic includes at least one of transmission range of the service invocation response information, receiver identification information of the service invocation response information, and message type of the service invocation response information.

In some embodiments, the request information generation module is further configured to generate the service invocation request information based on a service query result obtained in advance, in response to detecting that the current environment meets a condition for invoking a second device service in the preset software framework, where the service query result includes a result obtained by querying a service in the preset software framework in advance.

In some embodiments, the first device service includes a hub service configured in advance;

the apparatus further includes:

a service agent module, configured to act as an agent for a third device service to provide external service, in response to accepting entrustment of the third device service in the preset software framework, where the third device service includes a non-hub service configured in advance.

In some embodiments, the first device service includes a hub service configured in advance;

the apparatus further includes:

a service scheduling module configured to schedule, in response to detecting that the preset software framework includes two or more non-hub services capable of providing a same service, the non-hub services based on a preset service scheduling rule.

According to an aspect of the present disclosure, there is provided a gateway device, the device includes:

a processor and a memory for storing computer programs;

where the processor is configured to implement the method for invoking a service described in any one of the above aspects when executing the computer programs.

According to a seventh aspect of the present disclosure, there is provided a computer readable storage medium, on which a computer program is stored, where, when the program is executed by a processor, the method for invoking a service described in any one of the above aspects is implemented.

The technical solution provided by the embodiments of the present disclosure may include the following beneficial effects:

The software framework provided in this disclosure is applicable to a gateway device. The software framework includes an application service layer and a basic service layer. The application service layer includes at least one device service in advance, and the basic service layer includes a data bus built in advance, where: the device service corresponds to a capability of a device associated with the gateway device; and the data bus is used to realize the communication between the device service and an external service. The external service is a device service belonging to a same gateway device as the device service or a different gateway device with the device service. Because the ability of each device is abstracted as each service in the preset software framework, the communication of each device capability can be realized through the communication between each service. Moreover, the interfaces and contracts defined between various services are independent of the hardware platform, operating system and programming language that realize the services, so that the services built in the preset software framework can interact in a unified and universal way. Therefore, the decoupling of business development can be realized, which can reduce the workload of gateway development, be conductive to the subsequent expansion of gateway capabilities, and facilitate the later maintenance of the gateway. In addition, because the data bus is built in the preset software framework in advance, the information interaction between the first device service and the second device service under the gateway device can be realized based on the data bus, which can greatly simplify the application development logic in the gateway, so that the development of each application needs to pay attention to its own algorithm logic; and the data transmission inside the gateway is unified to the data bus, realizing the decoupling of information transmission.

What is claimed is:

1. A method for invoking a service, comprising:

generating, by a first device service in a preset software framework, service invocation request information in response to detecting that current environment meets a condition of invoking a second device service in the preset software framework, wherein the preset software framework is applicable to a gateway device, the preset software framework comprises a plurality of device services registered in advance, and each of the plurality of device services corresponds to a capability of a device associated with the gateway device in the current environment;

sending, by the first device service, the service invocation request information to the second device service based on a data bus preset in the preset software framework; and receiving, by the first device service, service invocation response information sent by a second gateway service based on the data bus, wherein the service invocation response information comprises information generated based on an obtained processing result after the second device service performs processing on the service invocation request information that is received;

wherein generating the service invocation request information in response to detecting that the current environment meets the condition of invoking the second device service in the preset software framework comprises:

generating the service invocation request information based on a service query result obtained in advance, in response to detecting that the current environment meets the condition of invoking the second device service in the preset software framework, wherein the service query result comprises a result obtained by querying a service in the preset software framework in advance.

2. The method according to claim 1, wherein sending the service invocation request information to the second device service based on the data bus preset in the preset software framework comprises:

publishing the service invocation request information to the data bus based on a first preset topic, causing the second device service to receive the service invocation request information sent by the data bus based on the first preset topic subscribed in advance, wherein the first preset topic comprises at least one of followings: a transmission range of the service invocation request information, receiver identification information of the service invocation request information or a message type of the service invocation request information.

3. The method according to claim 1, wherein receiving service invocation response information sent by the second gateway service based on the data bus comprises:

receiving the service invocation response information sent by the data bus based on a second preset topic subscribed in advance, wherein the service invocation response information comprises information generated based on an obtained processing result and published to the data bus based on the second preset topic, after the second device service performs processing on the received service invocation request information; and the second preset topic comprises at least one of followings: a transmission range of the service invocation response information, receiver identification information of the service invocation response information, or a message type of the service invocation response information.

4. The method according to claim 1, wherein, the first device service comprises a hub service configured in advance;
the method further comprises:
acting as an agent for a third device service to provide external service, in response to accepting entrustment of the third device service in the preset software framework, wherein the third device service comprises a non-hub service configured in advance.

5. The method according to claim 1, wherein, the first device service comprises a hub service configured in advance;
the method further comprises:
scheduling, in response to detecting that the preset software framework comprises two or more non-hub services capable of providing a same service, the non-hub services based on a preset service scheduling rule.

6. A gateway device, comprising:
a processor and a memory for storing computer programs;
wherein the processor is configured to implement acts comprising:
generating service invocation request information in response to detecting that current environment meets a condition of invoking a second device service in a preset software framework, wherein the preset software framework is applicable to the gateway device, the preset software framework comprises a plurality of device services registered in advance, and each of the device services corresponds to a capability of a device associated with the gateway device in the current environment;
sending the service invocation request information to the second device service based on a data bus preset in the preset software framework; and
receiving service invocation response information sent by a second gateway service based on the data bus, wherein the service invocation response information comprises information generated based on an obtained processing result after the second device service performs processing on the service invocation request information that is received;
wherein generating the service invocation request information in response to detecting that the current environment meets the condition of invoking the second device service in the preset software framework comprises:
generating the service invocation request information based on a service query result obtained in advance, in response to detecting that the current environment meets the condition of invoking the second device service in the preset software framework, wherein the service query result comprises a result obtained by querying a service in the preset software framework in advance.

7. The gateway device according to claim 6, wherein sending the service invocation request information to the second device service based on the data bus preset in the preset software framework comprises:
publishing the service invocation request information to the data bus based on a first preset topic, causing the second device service to receive the service invocation request information sent by the data bus based on the first preset topic subscribed in advance, wherein the first preset topic comprises at least one of followings: a transmission range of the service invocation request information, receiver identification information of the service invocation request information or a message type of the service invocation request information.

8. The gateway device according to claim 6, wherein receiving service invocation response information sent by the second gateway service based on the data bus comprises:
receiving the service invocation response information sent by the data bus based on a second preset topic subscribed in advance, wherein the service invocation response information comprises information generated based on an obtained processing result and published to the data bus based on the second preset topic, after the second device service performs processing on the received service invocation request information; and the second preset topic comprises at least one of followings: a transmission range of the service invocation response information, receiver identification information of the service invocation response information, or a message type of the service invocation response information.

9. The gateway device according to claim 6, wherein the first device service comprises a hub service configured in advance;
the method further comprises:
acting as an agent for a third device service to provide external service, in response to accepting entrustment of the third device service in the preset software framework, wherein the third device service comprises a non-hub service configured in advance.

10. The gateway device according to claim 6, wherein, the first device service comprises a hub service configured in advance;
the method further comprises:
scheduling, in response to detecting that the preset software framework comprises two or more non-hub services capable of providing a same service, the non-hub services based on a preset service scheduling rule.

* * * * *